United States Patent
Lurk et al.

(10) Patent No.: US 6,775,469 B1
(45) Date of Patent: Aug. 10, 2004

(54) METHOD OF CONTROLLING AN ELECTRONICALLY COMMUTATABLE MOTOR

(75) Inventors: Volker Lurk, Offenburg (DE); Joerg Sutter, Gaggenau (DE); Wolfgang Krauth, Achern-Sasbachried (DE); Wolfgang Schwenk, Oberkirch-Tiergarten (DE); Claude Berling, Drusenheim (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/111,489
(22) PCT Filed: Oct. 18, 2000
(86) PCT No.: PCT/DE00/03667
§ 371 (c)(1), (2), (4) Date: Aug. 27, 2002
(87) PCT Pub. No.: WO01/31772
PCT Pub. Date: May 3, 2001

(30) Foreign Application Priority Data

Oct. 26, 1999 (DE) .......................................... 199 51 364

(51) Int. Cl.$^7$ ............................. H02P 5/34; H02P 7/00; H02P 5/06
(52) U.S. Cl. ....................... 388/825; 388/804; 388/819; 388/829; 318/811
(58) Field of Search ................................ 388/804, 811, 388/819, 829, 831, 825; 318/66, 825, 101, 811

(56) References Cited

U.S. PATENT DOCUMENTS

| | | |
|---|---|---|
| 4,385,265 A | 5/1983 | Uzuka |
| 4,814,674 A | 3/1989 | Hrassky |
| 5,231,343 A * | 7/1993 | Nakamura ................... 318/696 |
| 5,712,539 A | 1/1998 | Zweighaft et al. |
| 5,767,641 A | 6/1998 | Kern et al. |
| 5,780,986 A | 7/1998 | Shelton et al. |
| 5,869,946 A | 2/1999 | Carabolante |
| 6,002,226 A | 12/1999 | Collier-Hallmann et al. |

FOREIGN PATENT DOCUMENTS

| | | |
|---|---|---|
| DE | 31 07 623 | 12/1981 |
| DE | 39 40 569 | 6/1991 |
| DE | 195 00 900 | 7/1996 |
| EP | 0 831 580 | 3/1998 |

* cited by examiner

Primary Examiner—Robert Nappi
Assistant Examiner—Patrick Miller
(74) Attorney, Agent, or Firm—Kenyon & Kenyon

(57) ABSTRACT

An electronically commutatable motor having field windings activatable in sequence with a commutation frequency via semiconductor output stages using control signals connectable and disconnectable from a direct voltage supply, the control signals being clocked using pulse width modulation. Noise generation from connection and disconnection of the current applied to field windings is minimized by flattening of the rising and/or falling edges of the current in the field windings. The pulse width ratio increases in the rising edges of the control signals from a low initial value to an operating value assigned to the setpoint as a function of a selected setpoint for the motor speed or output, and, in the falling edges of the control signals, the pulse width ratio starts from the existing operating value and is reduced to a lower final turn-off value as a function of the existing actual value of the speed or the output of the motor.

5 Claims, 1 Drawing Sheet

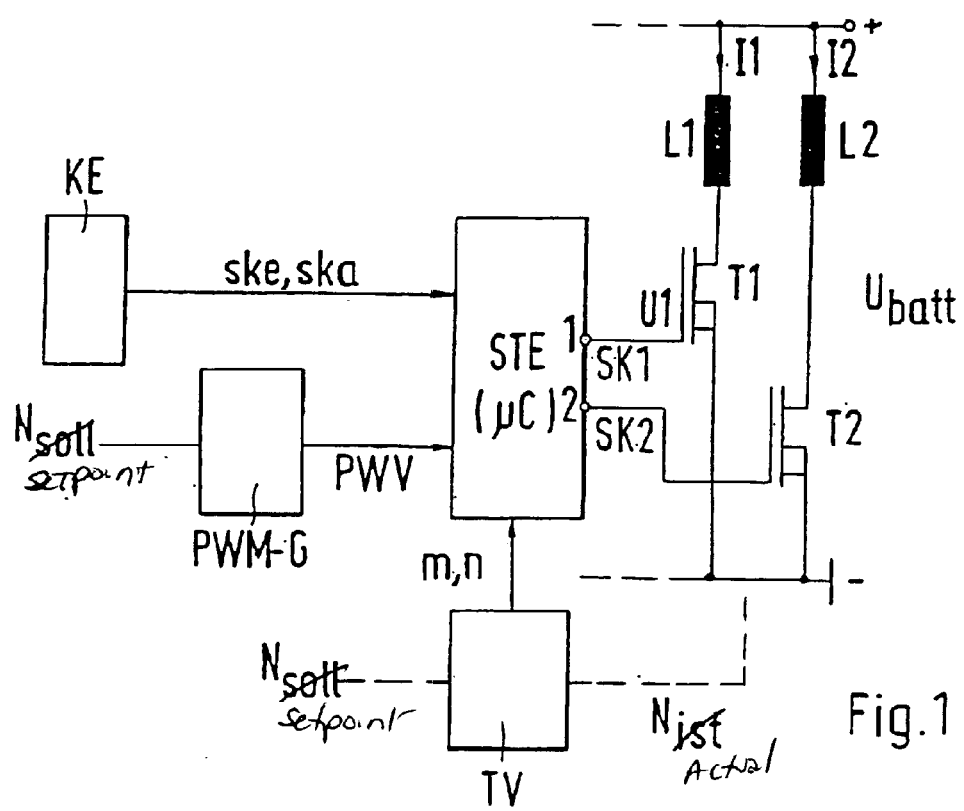
Fig.1
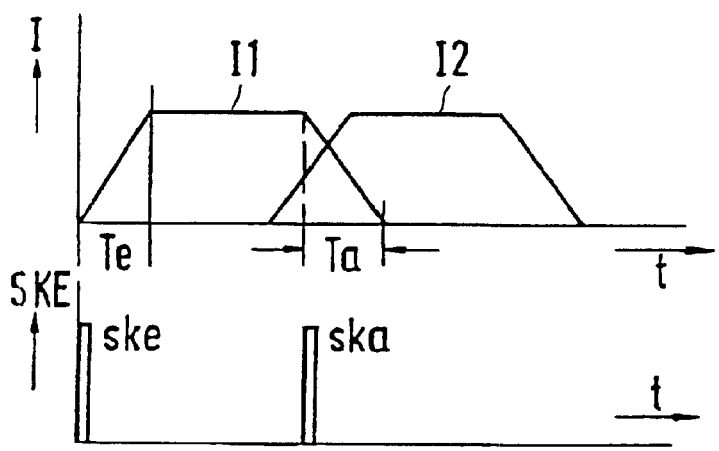
Fig.2
Fig.3
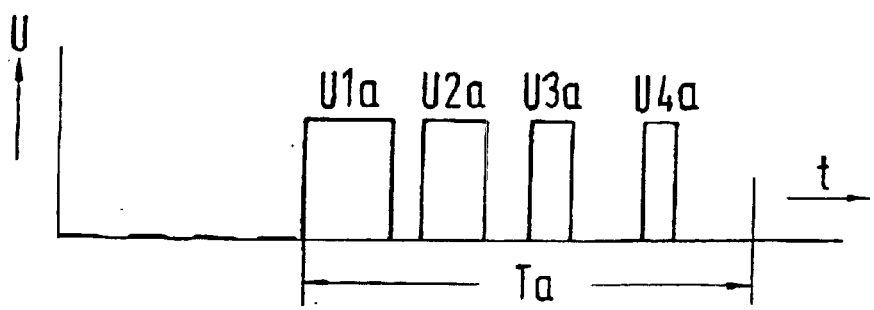
Fig.4

METHOD OF CONTROLLING AN ELECTRONICALLY COMMUTATABLE MOTOR

FIELD OF THE INVENTION

The present invention relates to a method of controlling an electronically commutatable motor having field windings that are activated, connected to and disconnected from a direct voltage supply in succession with a commutation frequency via semiconductor output stages using control signals. The sequential control signals overlap and at least one of the control signals is clocked in the overlap region using pulse width modulation, so that the current in the field windings increases in the rising edge and decreases in the falling edge. The control signals are changed as a function of a selectable setpoint of the rotational speed or the output of the motor.

BACKGROUND INFORMATION

A method of controlling a motor of this type is described in German Patent No. 39 40 569 and U.S. Pat. No. 5,712,539. In these references, the continuously increasing and/or decreasing commutation edges of the phase currents are achieved with low loss using a selected pattern. Activation of the field windings in this manner has the advantage that, through the clocking of the control signals in the overlap region, noise reduction as well as low switching losses are achieved. However, the permanent activation of the phases in the actual commutation phases (outside the rising and falling edges) produces significant difficulties in the event the motor is used to produce a higher speed or output range.

German Published Patent Application No. 195 00 900 describes continuing application of current at the instant of commutation to the preceding winding phase in the direction of commutation with controlled reduction of the current intensity, and application of current to the following winding phase in the direction of commutation. In this manner, a notch of the overall current of the winding phases and a speed notch at the instant of commutation may be avoided. The preceding winding phase in the direction of commutation, however, has current applied to it with the pulse width modulated using a decreasing pulse width ratio. Neither application of current to the subsequent winding phases nor a method of reducing the application of current to the preceding winding phases as a function of other performance quantities are discussed.

In U.S. Pat. No. 5,869,946, a method of controlling an electronically commutatable motor using additional PWM signals generated for all phases is described. According to this method, a trapezoidal shape of the phase current, and therefore a constant overall output, are achieved.

German Patent No. 31 07 623, U.S. Pat. No. 5,767,641, and U.S. Pat. No. 5,780,986 describe changing the current or the voltage for the windings of a brushless direct current motor in the rising and falling edges as a function of the existing load of the motor.

European Published Patent Application No. 831 580 shows an electronically commutatable motor in which the control signals for the windings are implemented as PWM signals, the pulse width ratio following a sinusoidal pattern. In this manner, noise generation may be reduced. However, such reduction occurs at the cost of the output of the motor.

SUMMARY

It is an object of the present invention to implement an electronically commutatable motor that, using simple pulse modulated control signals, suppresses noise generation which is greatly reduced over the entire commutation range and over the entire speed or output range.

This object is achieved according to the present invention by using PWM signals as control signals that have an operating value which is a function of a selected setpoint. In the rising edges of the control signals, the pulse width ratio increases from a low initial value to this operating value in a number of m steps which is a function of the setpoint or actual value. In the falling edges of the control signals, the pulse width ratio decreases in a number of n steps starting from this operating value before the pulse width ratio drops back to the value zero. The number steps, n, is also selected as a function of the setpoint or actual value.

Through the additional adjustment of the control signals in the rising and falling edges of the control signals to the selected setpoint or the existing actual value of the speed or the output of the motor, significant reduction in noise is achieved over the entire speed or output range of the motor without an excessive increase in control outlay.

Since the pulse width ratio in the rising and/or falling edges is not kept constant, but is changed as a function of the setpoint and/or the actual value of the speed or the output, smooth switching on and off of the current is achieved in the entire operating range of the motor. A strong force effect on the poles and field windings of the stator no longer occurs, so that the noise level is always significantly lower. Since the change of the pulse width ratio is also made a function of the actual value of the motor speed or output, this applies over the entire speed range of the motor and the noise reduction is achieved both for the switching on procedure and for the switching off procedure for the application of current.

According to one embodiment, the m and n steps of the pulse width ratio in the rising edges and/or the falling edges of the control signals are maintained over at least one period of the clock frequency of the PWM signals. The rising and/or falling edges of the control signals may also have m and n steps of changing pulse width ratios which each extend over a larger number of periods of the PWM signals.

In an embodiment in which selected speed or output ranges of the motor are assigned different numbers m and n of steps of the pulse width ratio and the assigned number m and n of steps of the pulse width ratio is put into effect in the rising edge and/or the falling edge of the control signals according to the actual value of the speed or the output of the motor, the number m and n of steps in the rising and/or falling edges of the control signals may be assigned immediately using the detected actual value of the motor speed or output.

It is advantageous in this case if the different numbers m and n of steps may be represented using 4, 8, 16, etc., using the base 2 and integer powers 1, 2, 3, etc., in order to keep the outlay in the motor control unit small.

According to one embodiment, the change in the pulse width ratio may be performed, in such a way that, in the rising edge of the control signals, the pulse width ratio is initialized using an initial value which is selected through the operating value assigned to the setpoint divided by the number of steps of the pulse width ratio in the rising edge, and that, in the falling edge of the control signals, the final pulse width ratio is determined using a final turn-off value which is selected through the operating value assigned to the setpoint divided by the number of steps of the pulse width ratio in the falling edge, before the pulse width ratio drops to zero.

For stepped modification of the pulse width ratio in the m steps of the rising edges of the control signals, the pulse width ratio is selected to increase from step to step by the initial value. In the n steps of the falling edges of the control signals, the pulse width ratio is selected decreasing from step to step by the final turn-off value.

The initial value and/or the final turn-off value of the pulse width ratio may also be zero.

If the PWM control signals switch through the semiconductor output stages, the power loss in the semiconductor output stages is kept low.

If the falling edge of the control signals for a semiconductor output stage at least partially overlap the rising edge of the control signals of the following semiconductor output stage during commutation, and if the semiconductor output stages may be determined individually and independently from one another in the overlap region of the control signals, then the control signals for the semiconductor output stages are individual and independent in the overlap region.

BRIEF DESCRIPTION OF THE DRAWINGS

FIG. 1 shows a block diagram of an electrically commutatable motor according to an embodiment of the present invention.

FIG. 2 shows a time diagram for the current characteristic in the field windings according to an exemplary embodiment of the present invention.

FIG. 3 shows a time diagram of commutation signals which identify the turn-on and turn-off instants of a control signal according to an exemplary embodiment of the present invention.

FIG. 4 shows the control signal characteristic of the semiconductor output stages during a falling edge in a voltage-time diagram according to an exemplary embodiment of the present invention.

DETAILED DESCRIPTION

FIG. 1 illustrates an exemplary embodiment of an electronically commutatable motor having two field windings L1 and L2, referred to as phases. When switched through, semiconductor output stages T1 and T2 connect the field windings L1, L2 to direct voltage supply $U_{batt}$. If semiconductor output stages T1 and T2 are not activated, then field windings L1 and L2 are disconnected from direct voltage supply $U_{batt}$, since semiconductor output stages T1 and T2 are high resistance, i.e., nonconductive. Semiconductor output stages T1 and T2 are activated by an electronic control unit STE, which is implemented using a microcomputer and has a number of outputs 1, 2 which corresponds to the number of semiconductor output stages T1 and T2. FIG. 2 illustrates the basic shape of currents I1 and I2, which occur in field windings L1 and L2. Rising edge Te and falling edge Ta of the current in L1 and L2 (illustrated for I1) are flattened and extend over finite time periods.

In this case, control signals SK1 and SK2 are used successively with a commutation frequency for repeated activation of semiconductor output stages T1 and T2.

The number of semiconductor output stages and the number of control outputs of control unit STE depends on the construction of the motor and may also be greater than 2.

Control unit STE is coupled to a commutation device KE and a PWM signal generator PWM-G, which are shown in FIG. 1 as separate functional units, but may also be combined with control unit STE as an integrated electronic motor control unit.

As is shown in PWM signal generator PWM-G, a-setpoint $N_{setpoint}$ for the speed or the output of the motor may be selected and, via a clock selection device TV, a number of steps for rising and the falling edges Te and Ta of current I1 and I2 in field windings L1 and L2 are selected as a function of actual value $N_{actual}$ of the speed or the output. In this way, speed ranges are established, to which a specific number of steps are assigned. Rising edges Te are subdivided into m steps and falling edges Ta are subdivided into n steps. Numbers m and n may be selected to be different or equal; however, they may change as a function of the signal of clock selection device TV, which is a function of actual value $N_{actual}$ and the speed or output range assigned thereto in clock selection device TV.

Commutation device KE delivers commutation signals SKE, as shown in FIG. 3, which, using control pulses ska and ske, mark the beginning of currents I1 and I2 and the beginning of the turn-off procedure of the control signals.

An exemplary illustration of a control signal of a semiconductor output stage during a falling edge Ta is shown in enlarged form in FIG. 4.

It must also be noted that setpoint $N_{setpoint}$ causes, at PWM signal generator PWM-G, the PWM signals to have a corresponding assigned pulse width ratio $PWV_{setpoint}$, which predominates while currents I1 and I2 are constant and clocks them in the rhythm of the clock frequency of PWM signal generator PWM-G.

If pulse width ratio $PWV_{setpoint}$ is, for example, 0.8 at the beginning of the turn-off procedure, as shown in FIG. 4, and clock selection device TV has assigned a number of steps n=4 for actual value $N_{actual}$, then falling edge Ta of the pulse width ratio is reduced in the four steps, starting from existing value $PWV_{setpoint}$=0.8, in steps which are given by $PWV_{setpoint}$ divided by the number n=4. This reduction of the pulse width ratio then occurs in such a way that the following steps have pulse width ratios of 0.6, 0.4, and 0.2, as shown by control pulses U1a, U2a, U3a, Una of voltage U for semiconductor output stages T1 in FIG. 4. In this case, the last step may end with PWVe=0.2. Pulse width ratio PWVe=0.2 identifies the last step of falling edge Ta; it may also end with PWVe=0. After turn-off edge Ta, pulse width ratio PWVe is then "0" in any case. Number n of the steps of pulse width ratio PWV and the pulse width ratio in the steps are determined by control unit STE by gating the signals of commutation device KE shown in FIG. 1, commutation signals SKE shown in FIG. 3, and the selection by clock selection device TV.

In the same way, rising edges Te of the control signals may be clocked, selected setpoint $N_{setpoint}$ selecting operating value $PWV_{setpoint}$ to be reached for PWM signal generator PWM-G, which is to be reached at the end of rising edge Te. Clock selection device TV establishes number m of the steps for pulse width ratio PWV in rising edge Te corresponding to this operating value. The control pulses do not decrease in rising edge Te, but correspondingly increase in the reverse sequence of FIG. 4, until control pulse U1a corresponds to operating value $PWV_{setpoint}$. Number m of the steps may also change as a function of setpoint $N_{setpoint}$ and actual value $N_{actual}$ in rising edge Te. Numbers m and n may be selected as different powers of the base 2, e.g., $2^2$, $2^3$, and $2^4$, equal to 4, 8, and 16, since this results in a minimum outlay in clock selection device. TV and control unit STE.

It is noted that the clock control signals switch through semiconductor output stages T1 and T2 via their control pulses, in order to keep their power loss as small as possible.

What is claimed is:

1. A method of controlling an electronically commutatable motor including field windings, comprising:

selecting a setpoint of one of a rotational speed and an output of the motor;

activating the field windings;

alternately connecting and disconnecting the field windings from a direct voltage supply in succession, at a commutation frequency, via a semiconductor output stage, using control signals, the control signals being formed as pulse-width modulated signals including rising and falling edges and having an operating value based on the selected setpoint, a current in the field windings increasing with the rising edges of the control signals and decreasing with the falling edges of the control signals, successive control signals overlapping in an overlap region; and clocking at least one of the control signals in the overlap region using pulse width modulation, wherein a pulse width ratio increases in the rising edges of the control signals from a low initial value to the operating value in a number of m steps, the number of m steps being a function of one of the selected setpoint and an actual speed value, wherein the pulse width ratio decreases in the falling edges of the control signals starting from the operating value in a number of n steps before the pulse width ratio drops to a value zero, the number of n steps being a function of one of the selected setpoint and the actual speed value, and wherein selected output ranges of the motor are each assigned a different number of m steps and n steps; and determining values for the number of m steps and the number of n steps based on the actual speed value.

2. A metod of controlling an electronically commutatable motor including field windings, comprising:

selecting a setpoint of one of a rotational speed and an output of the motor;

activating the field windings;

alternately connecting and disconnecting the field windings from a direct voltage supply in succession, at a commutation frequency, via a semiconductor output stage, using control signals, the control signals being formed as pulse-width modulated signals including rising and falling edges and having an operating value based on the selected setpoint, a current in the field windings increasing with the rising edges of the control signals and decreasing with the falling edges of the control signals, successive control signals overlapping in an overlap region;

clocking at least one of the control signals in the overlap region using pulse width modulation, wherein a pulse width ratio increases in the rising edges of the control signals from a low initial value to the operating value in a number of m steps, the number of m steps being a function of one of the selected setpoint and an actual speed value, and wherein the pulse width ratio decreases in the falling edges of the control signals starting from the operating value in a number of n steps before the pulse width ratio drops to a value zero, the number of n steps being a function of one of the selected setpoint and the actual speed value; and initializing the pulse width ratio in the rising edges of the control signals at an initial value, the initial value being calculated based on the operating value assigned to the selected setpoint divided by the number of m steps of the pulse width ratio in the rising edges.

3. A method of controlling an electronically commutatable motor including field windings, comprising:

selecting a setpoint of one of a rotational speed and an output of the motor;

activating the field windings;

alternately connecting and disconnecting the field windings from a direct voltage supply in succession, at a commutation frequency, via a semiconductor output stage, using control signals, the control signals being formed as pulse-width modulated signals including rising and falling edges and having an operating value based on the selected setpoint, a current in the field windings increasing with the rising edges of the control signals and decreasing with the falling edges of the control signals, successive control signals overlapping in an overlap region;

clocking at least one of the control signals in the overlap region using pulse width modulation, wherein a pulse width ratio increases in the rising edges of the control signals from a low initial value to the operating value in a number of m steps, the number of m steps being a function of one of the selected setpoint and an actual speed value, and wherein the pulse width ratio decreases in the falling edges of the control signals starting from the operating value in a number of n steps before the pulse width ratio drops to a value zero, the number of n steps being a function of one of the selected setpoint and the actual speed value; and finalizing a value of the pulse width ratio in the falling edges of the control signals at a final turn-off value, the final turn-off value being calculated based on the operating value assigned to the selected setpoint divided by the number of n steps of the pulse width ratio in the falling edge before the pulse width ratio drops to zero.

4. The method of claim 2, further comprising:

increasing the pulse width ratio in each of the number of m steps of the rising edges of the control signals by the initial value.

5. The method of claim 3, further comprising:

decreasing the pulse width ratio in each of the number of n steps of the falling edges of the control signals by the final turn-off value.

* * * * *